(12) United States Patent
Wang et al.

(10) Patent No.: US 11,422,617 B2
(45) Date of Patent: Aug. 23, 2022

(54) SYSTEMS AND METHODS FOR PROVIDING PEAK CURRENT ASSISTANCE TO A VOLTAGE REGULATOR USING A SWITCHED CAPACITOR CONVERTER

(71) Applicant: Dell Products L.P., Round Rock, TX (US)

(72) Inventors: Lei Wang, Austin, TX (US); John J. Breen, Harker Heights, TX (US); Mehran Mirjafari, Austin, TX (US); Guangyong Y. Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 371 days.

(21) Appl. No.: 16/558,966

(22) Filed: Sep. 3, 2019

(65) Prior Publication Data
US 2021/0064120 A1    Mar. 4, 2021

(51) Int. Cl.
*H02M 3/07* (2006.01)
*G06F 1/3296* (2019.01)
*G06F 1/28* (2006.01)

(52) U.S. Cl.
CPC .............. *G06F 1/3296* (2013.01); *G06F 1/28* (2013.01); *H02M 3/07* (2013.01)

(58) Field of Classification Search
None
See application file for complete search history.

(56) References Cited

U.S. PATENT DOCUMENTS

| | | | | |
|---|---|---|---|---|
| 6,144,194 A * | 11/2000 | Varga | ................. | H02M 3/1584 323/269 |
| 6,703,812 B1 * | 3/2004 | Lethellier | ........... | H02M 3/1584 323/284 |
| 6,943,535 B1 * | 9/2005 | Schiff | ................. | H02M 3/1584 323/244 |
| 7,825,715 B1 * | 11/2010 | Greenberg | ........... | H03B 5/1228 327/554 |
| 7,928,705 B2 * | 4/2011 | Hooijschuur | ........... | H02M 3/07 323/272 |
| 7,969,129 B2 * | 6/2011 | Kudo | ................. | H02M 3/1584 323/266 |
| 8,330,436 B2 * | 12/2012 | Oraw | ..................... | H02M 3/07 323/272 |
| 8,417,980 B1 * | 4/2013 | Mimberg | ................. | G06F 1/26 713/330 |
| 9,143,032 B2 * | 9/2015 | Le | ............................ | H02M 3/07 |
| 9,729,056 B2 * | 8/2017 | Ejury | .................... | H02M 3/158 |
| 9,735,574 B2 * | 8/2017 | Tournatory | .............. | H02J 3/00 |
| 9,917,510 B2 * | 3/2018 | Ahmed | ............... | H02M 3/1584 |
| 10,686,380 B2 * | 6/2020 | Giuliano | ................ | H02M 3/07 |
| 10,707,691 B2 * | 7/2020 | Huang | ................ | H02J 7/00712 |
| 10,886,851 B1 * | 1/2021 | Fletcher | ............... | H02M 3/156 |

(Continued)

*Primary Examiner* — Thomas J. Hiltunen
(74) *Attorney, Agent, or Firm* — Jackson Walker L.L.P.

(57) ABSTRACT

A power system may include a plurality of voltage regulator phases each configured to generate an output voltage at its output from an input voltage, a switched capacitor power converter sharing its output with the outputs of the plurality of voltage regulator phases and configured to, when enabled, generate the output voltage at its output from the input voltage, and a power controller configured to selectively enable and disable the switched capacitor power converter based on electrical current requirements of the power system.

9 Claims, 3 Drawing Sheets

(56) References Cited

U.S. PATENT DOCUMENTS

2009/0206804 A1* 8/2009 Xu ................. H02M 3/1584
323/234
2015/0008890 A1* 1/2015 Sasao ................ H02M 1/088
323/271

* cited by examiner

SYSTEMS AND METHODS FOR PROVIDING PEAK CURRENT ASSISTANCE TO A VOLTAGE REGULATOR USING A SWITCHED CAPACITOR CONVERTER

TECHNICAL FIELD

The present disclosure relates in general to information handling systems, and more particularly to systems and methods for providing peak current assistance to a voltage regulator using a switched capacitor converter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Many voltage regulators may be capable of operating in multiple phases, wherein a phase for a voltage regulator may typically refer to combining a driver and a power stage to form one phase. Thus, a multi-phase voltage regulator may include multiple instances of such combinations.

In some instances, a peak current required by a load may require the presence of multiple phases of a voltage regulator. However, such peak current may not frequently occur, meaning that for the bulk of operation of the power system, the power system may include more phases than needed. Because such phases may add cost and a large amount of space, it may be desirable to minimize the number of voltage regulator phases while still providing peak current requirements to a load when necessary.

SUMMARY

In accordance with the teachings of the present disclosure, the disadvantages and problems associated with existing approaches to generating current in a multi-phase voltage regulator power system may be reduced or eliminated.

In accordance with embodiments of the present disclosure, an information handling system comprises a processor and a power system. The power system may include a plurality of voltage regulator phases each configured to generate an output voltage at its output from an input voltage, a switched capacitor power converter sharing its output with the outputs of the plurality of voltage regulator phases and configured to, when enabled, generate the output voltage at its output from the input voltage, and a power controller configured to selectively enable and disable the switched capacitor power converter based on electrical current requirements of the information handling system.

In accordance with these and other embodiments of the present disclosure, a method may include, in a power system comprising a plurality of voltage regulator phases each configured to generate an output voltage at its output from an input voltage and a switched capacitor power converter sharing its output with the outputs of the plurality of voltage regulator phases and configured to, when enabled, generate the output voltage at its output from the input voltage: determining electrical current requirements for a load of the power system and selectively enabling and disabling the switched capacitor power converter based on electrical current requirements.

In accordance with these and other embodiments of the present disclosure, a power system may include a plurality of voltage regulator phases each configured to generate an output voltage at its output from an input voltage, a switched capacitor power converter sharing its output with the outputs of the plurality of voltage regulator phases and configured to, when enabled, generate the output voltage at its output from the input voltage, and a power controller configured to selectively enable and disable the switched capacitor power converter based on electrical current requirements for the power system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
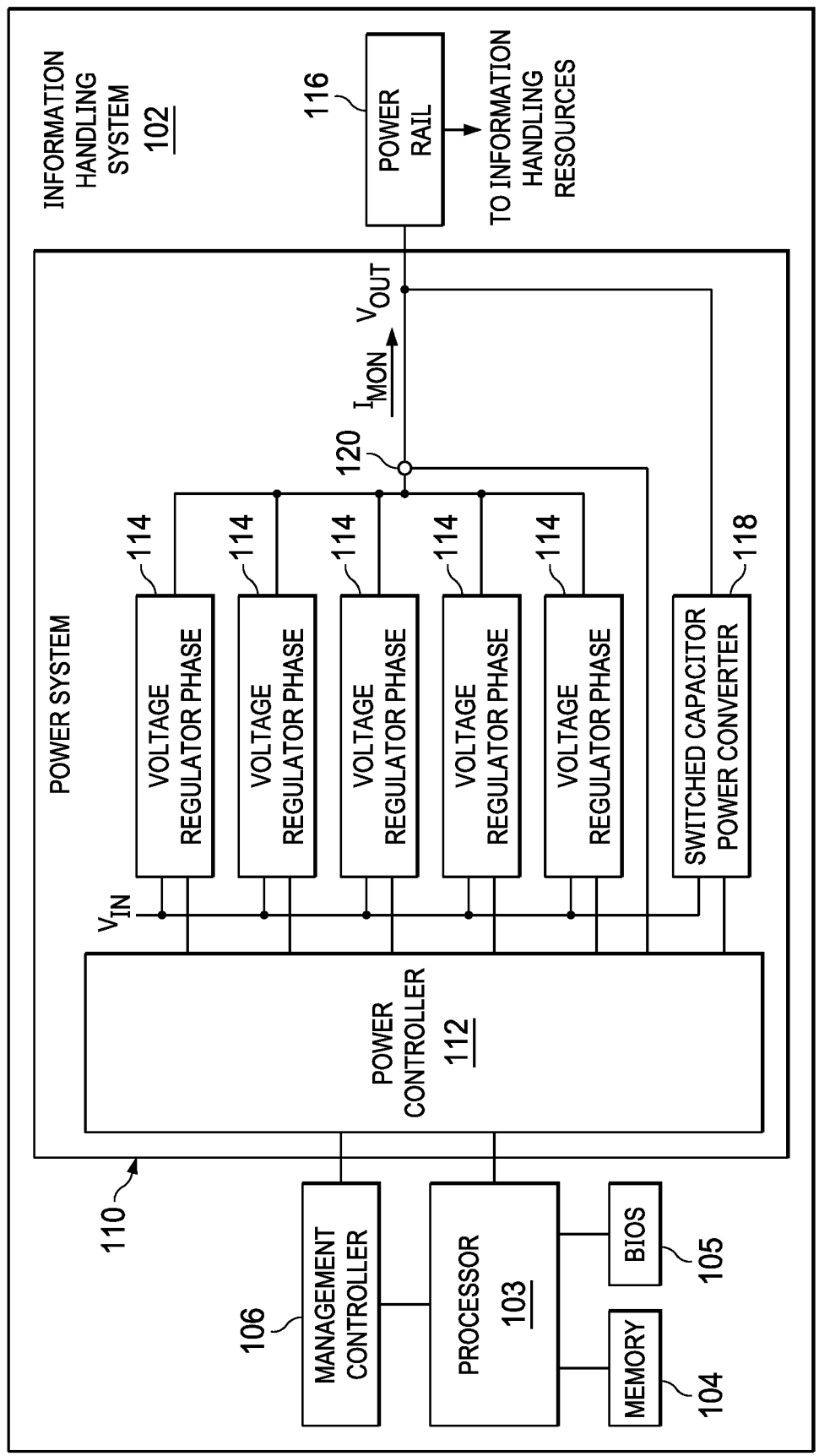
FIG. 1 illustrates a block diagram of selected components of an example information handling system, in accordance with embodiments of the present disclosure.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 106 communicatively coupled to processor 103, a power system 110, and a power rail 116 for supplying power to one or more information handling resources of information handling system 102.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Management controller 106 may be configured to provide out-of-band management facilities for management of information handling system 102. Such management may be made by management controller 106 even if a host system of information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC).

Power system 110 may include a power controller 112, a plurality of voltage regulator phases 114, a switched capacitor power converter 118, and a current monitor 120.

Power controller 112 may include any system, device, or apparatus configured to control the output of power system 110, including the control of switches internal to voltage regulator phases 114, the control of switches internal to switched capacitor power converter 118, and/or selectively enable and disable switched capacitor power converter 118, as described in greater detail below.

Each voltage regulator phase 114 may include any system, device, or apparatus configured to supply a portion of the total current output of power system 110. In embodiments in which power system 110 is a multi-phase voltage regulator, a voltage regulator phase 114 may comprise a phase of the voltage regulator. As shown in FIG. 1, a voltage regulator phase 114 may be controlled (e.g., switched) so as to receive an input voltage $V_{IN}$ and convert such input voltage $V_{IN}$ to an output voltage $V_{OUT}$. An example of a voltage regulator phase 114 is shown and described below in regards to FIG. 2.

A switched capacitor power converter 118 may comprise any suitable system, device, or apparatus that relies predominantly on a plurality of switches and capacitors appropriately arranged and switched (e.g., under the control of power controller 112) to convert an input voltage $V_{IN}$ to an output voltage $V_{OUT}$. An example of switched capacitor power converter 118 is shown and described below in regards to FIG. 3.

Current monitor 120 may comprise any suitable system, device, or apparatus (e.g., a sense resistor in combination with an amplifier) configured to sense a cumulative current $I_{MON}$ generated by voltage regulator phases 114.

In addition to processor 103, memory 104, BIOS 105, management controller 106, power system 110, and power rail 116, information handling system 102 may include one or more other information handling resources. For example, in some embodiments, power system 110 may include greater or fewer voltage regulator phases 114 than that depicted in FIG. 1.

Figure 2:
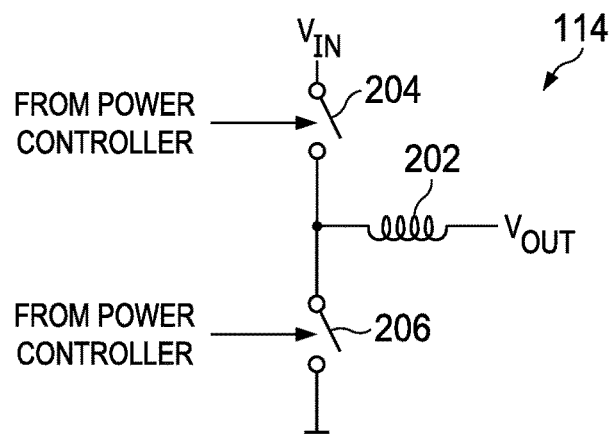
FIG. 2 illustrates a circuit diagram of selected components of an example voltage regulator phase, in accordance with embodiments of the present disclosure.

FIG. 2 illustrates a circuit diagram of selected components of an example voltage regulator phase 114, in accordance with embodiments of the present disclosure. In the embodiment represented in FIG. 2, each regulator phase 114 may be implemented as an inductor-based power converter in a buck configuration. In such configuration, voltage regulator phase 114 may include a power inductor 202 and switches 204 and 206 arranged as shown in FIG. 2. In operation, power controller 112 may generate control signals for selectively activating and deactivating switches 204 and 206 (e.g., switch 204 may be activated when switch 206 is deactivated, and vice versa), to generate a desired output voltage $V_{OUT}$ from input voltage $V_{IN}$ (e.g., modulating duty cycles of switches 204 and 206 to generate desired output voltage $V_{OUT}$). For example, in some embodiments, input voltage $V_{IN}$ may be a direct-current voltage of 12 volts and output voltage $V_{OUT}$ may be a direct-current voltage of 1.8 volts.

Figure 3:
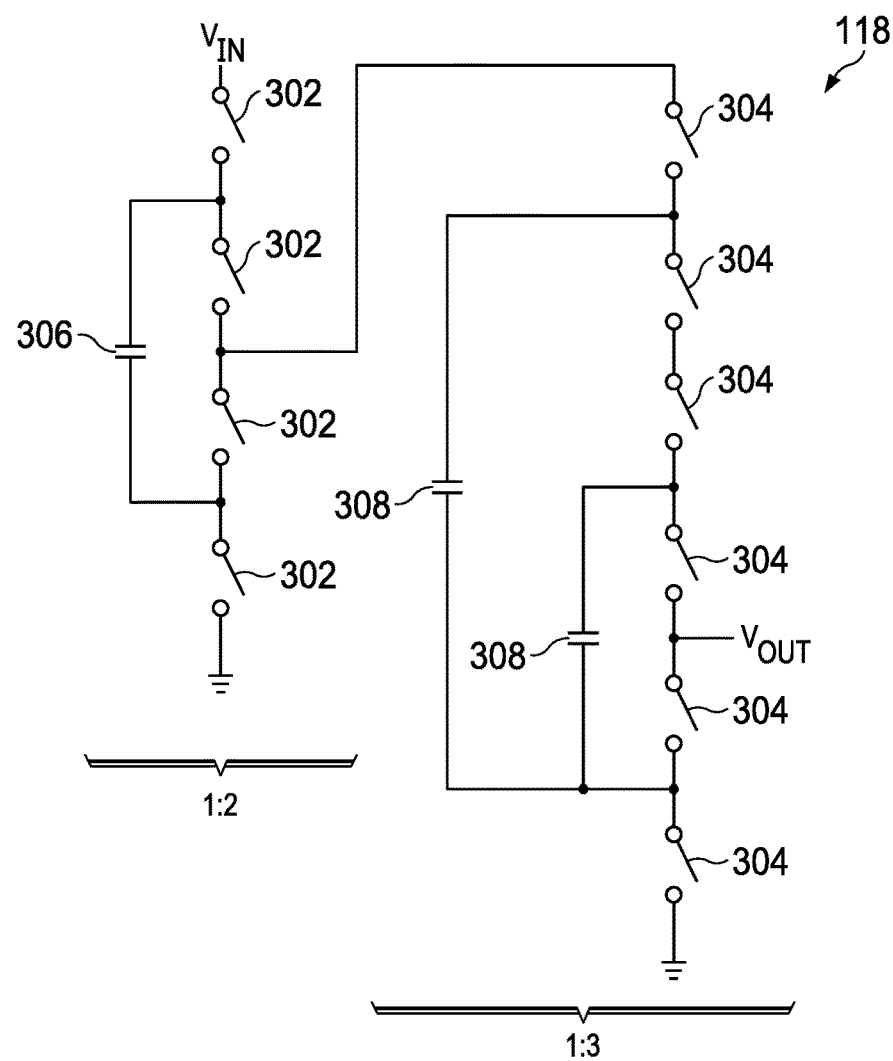
FIG. 3 illustrates a circuit diagram of selected components of an example switched capacitor power converter, in accordance with embodiments of the present disclosure.

FIG. 3 illustrates a circuit diagram of selected components of an example switched capacitor power converter 118, in accordance with embodiments of the present disclosure. Although other architectures for switched capacitor power converter 118 may be utilized in accordance with this disclosure, in the embodiments represented by FIG. 3, switched capacitor power converter 118 may comprise switches 302 and 304 and capacitors 306 and 308 arranged as shown. In operation, power controller 112 may generate control signals for selectively activating and deactivating switches 302 and 304, to generate a desired output voltage $V_{OUT}$ from input voltage $V_{IN}$ (e.g., modulating duty cycles and timings of switches 302 and 304 to generate desired output voltage $V_{OUT}$). For example, switched capacitor power converter 118 may include one or more stages, wherein each stage converts the voltage received at its input to another voltage. In the specific example shown in FIG. 3, example switched capacitor power converter 118 has a first stage that (in an ideal case) would convert input voltage $V_{IN}$ to an intermediate voltage one-half of input voltage $V_{IN}$, and convert the intermediate voltage to one-third of the intermediate voltage, to generate an output voltage $V_{OUT}$ approximately one-sixth of input voltage $V_{IN}$. However, because the converter efficiency of switched capacitor power converter 118 may be less than 100%, output voltage $V_{OUT}$ may be less than one-sixth of input voltage $V_{IN}$. Factors that may affect efficiency may include switching frequency, gate drive voltage, and other factors. One particular factor that may be more readily manipulated is an equivalent resistance of a switched capacitor converter, which may be given in simplified form as R=1/fC, where R is the equivalent resistance, f is the switching frequency, and C is an equivalent capacitance of the switched capacitor converter. Thus, such factors (e.g., frequency) may be manipulated to operate at an efficiency in order to generate a desired output voltage $V_{OUT}$ from a given input voltage $V_{IN}$. For example, in embodiments in which voltage regulator phases 114 generate an output voltage $V_{OUT}$ of 1.8 volts from an input voltage $V_{IN}$ of 12 volts, power controller 112 may manipulate a switching frequency or one or more other factors associated with the operation of switched capacitor power converter 118 such that example switched capacitor power converter 118 shown in FIG. 3 is operated at 90% efficiency, such that output voltage $V_{OUT}$ generated by example switched capacitor power converter 118 equals 90%×(1/6)×12 volts=1.8 volts.

Thus, in operation, power controller 112 may control switching of voltage regulator phases 114 and switched capacitor power converter 118 to generate a desired output voltage $V_{OUT}$ from a given input voltage $V_{IN}$. However, in addition, power controller 112 may selectively enable and disable switched capacitor power converter 118 based on current demands of information handling system 102, which may be indicated by monitored current $I_{MON}$. Thus, when monitored current $I_{MON}$ exceeds a threshold current level, power controller 112 may enable switched capacitor power converter 118, so that switched capacitor power converter 118 may provide additional current to supplement the current-generating capacity of voltage regulator phases 114. Further, when monitored current $I_{MON}$ is less than the threshold current level, power controller 112 may disable switched capacitor power converter 118 such that it generates no current, with voltage regulator phases 114 being sufficient to generate the current needs of information handling system 102.

Figure 4:
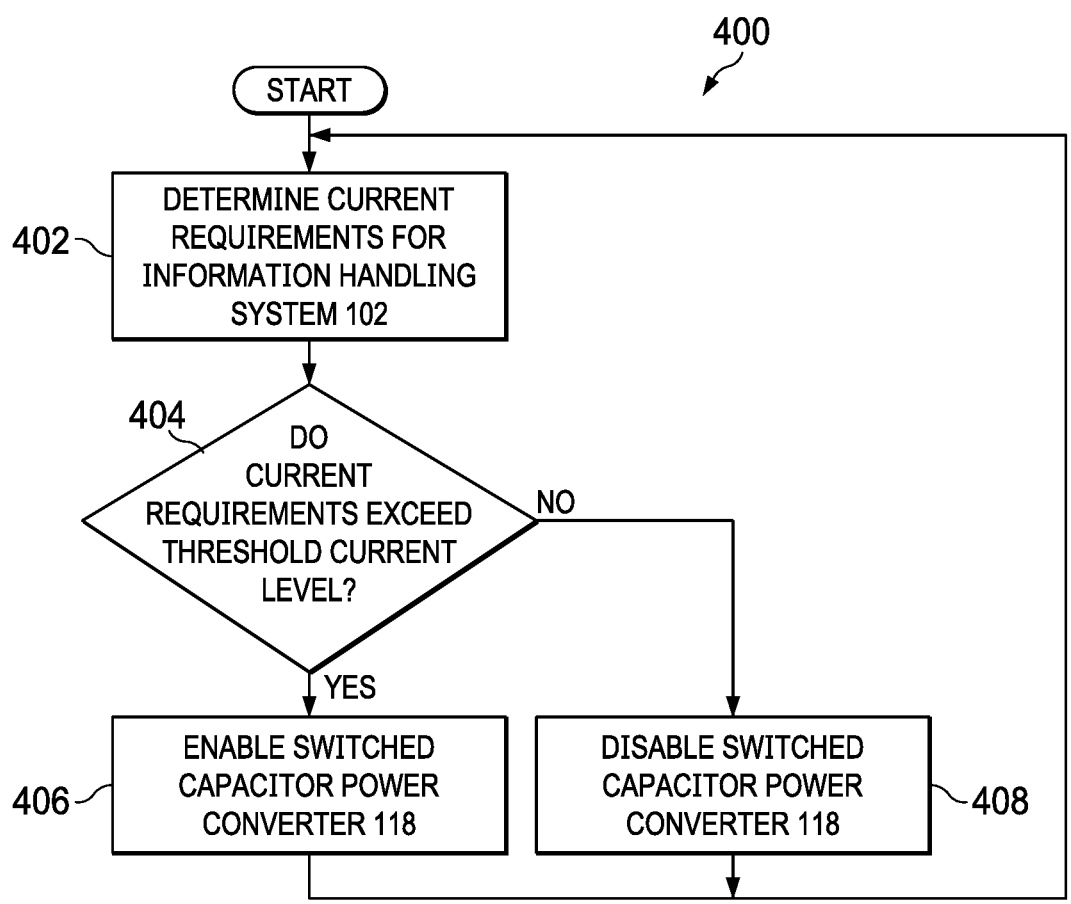
FIG. 4 illustrates a flow chart of an example method for providing peak current assistance to a voltage regulator using a switched capacitor converter, in accordance with embodiments of the present disclosure.

FIG. 4 illustrates a flow chart of an example method 400 for providing peak current assistance to a voltage regulator using a switched capacitor converter, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, power controller 112 may determine current requirements for information handling system 102 (e.g., by receiving monitored current $I_{MON}$). At step 404, power controller 112 may compare such current requirements to a threshold current level. If the current requirements exceed the threshold current level, method 400 may proceed to step 406. Otherwise, method 400 may proceed to step 408.

At step 406, power controller 112 may enable switched capacitor power converter 118 (or, if switched capacitor power converter 118 is already enabled, leave switched capacitor power converter 118 enabled). After completion of step 406, method 400 may proceed again to step 402.

At step 408, power controller 112 may disable switched capacitor power converter 118 (or, if switched capacitor power converter 118 is already disabled, leave switched capacitor power converter 118 disabled). After completion of step 408, method 400 may proceed again to step 402.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a power system comprising:
      a plurality of voltage regulator phases each configured to generate an output voltage at its output from an input voltage;
      a switched capacitor power converter comprising a plurality of switched capacitors, the switched power converter in parallel with the plurality of voltage regulator phases, sharing its output with the outputs of the plurality of voltage regulator phases and sharing its input with the inputs of the plurality of voltage regulator phases, and configured to, when enabled, generate the output voltage at its output from the input voltage; and
      a power controller configured to:
         selectively enable and disable the switched capacitor power converter based on electrical current requirements of the information handling system; and
         control an efficiency of the switched capacitor power converter such that the switched capacitor power converter generates the output voltage from the input voltage as a function of the efficiency by controlling a switching frequency of switches internal to the switched capacitor power converter in order to control an effective resistance of the switched capacitor power converter.

2. The information handling system of claim 1, wherein the power converter is configured to:
   enable the switched capacitor power converter when the electrical current requirements are more than a threshold current level; and
   disable the switched capacitor power converter when the electrical current requirements are less than the threshold current level.

3. The information handling system of claim 1, wherein the power controller is further configured to:
   monitor a cumulative current generated by the plurality of voltage regulator phases; and
   determine the electrical current requirements of the information handling system based on the cumulative current.

4. A method comprising, in a power system comprising a plurality of voltage regulator phases each configured to generate an output voltage at its output from an input voltage and a switched capacitor power converter comprising a plurality of switched capacitors, the switched power converter in parallel with the plurality of voltage regulator phases, sharing its output with the outputs of the plurality of voltage regulator phases and sharing its input with the inputs of the plurality of voltage regulator phases, and configured to, when enabled, generate the output voltage at its output from the input voltage:

determining electrical current requirements for a load of the power system;

selectively enabling and disabling the switched capacitor power converter based on electrical current requirements; and controlling an efficiency of the switched capacitor power converter such that the switched capacitor power converter generates the output voltage from the input voltage as a function of the efficiency by controlling a switching frequency of switches internal to the switched capacitor power converter in order to control an effective resistance of the switched capacitor power converter.

5. The method of claim 4, further comprising:

enabling the switched capacitor power converter when the electrical current requirements are more than a threshold current level; and disabling the switched capacitor power converter when the electrical current requirements are less than the threshold current level.

6. The method of claim 4, further comprising:

monitoring a cumulative current generated by the plurality of voltage regulator phases; and determining the electrical current requirements of the information handling system based on the cumulative current.

7. A power system comprising:

a plurality of voltage regulator phases each configured to generate an output voltage at its output from an input voltage;

a switched capacitor power converter comprising a plurality of switched capacitors, the switched power converter in parallel with the plurality of voltage regulator phases, sharing its output with the outputs of the plurality of voltage regulator phases and sharing its input with the inputs of the plurality of voltage regulator phases, and configured to, when enabled, generate the output voltage at its output from the input voltage; and a power controller configured to:

selectively enable and disable the switched capacitor power converter based on electrical current requirements for the power system; and control an efficiency of the switched capacitor power converter such that the switched capacitor power converter generates the output voltage from the input voltage as a function of the efficiency by controlling a switching frequency of switches internal to the switched capacitor power converter in order to control an effective resistance of the switched capacitor power converter.

8. The power system of claim 7, wherein the power converter is configured to:

enable the switched capacitor power converter when the electrical current requirements are more than a threshold current level; and disable the switched capacitor power converter when the electrical current requirements are less than the threshold current level.

9. The power system of claim 7, wherein the power controller is further configured to:

monitor a cumulative current generated by the plurality of voltage regulator phases; and determine the electrical current requirements of the information handling system based on the cumulative current.

* * * * *